United States Patent [19]

Leonhardt et al.

[11] Patent Number: 5,128,815
[45] Date of Patent: Jul. 7, 1992

[54] APPARATUS FOR INTERFACING A CARTRIDGE TAPE WITH A HELICAL SCAN TRANSPORT

[75] Inventors: Michael L. Leonhardt, Longmont; Charles A. Milligan, Golden, both of Colo.

[73] Assignee: Storage Technology Corporation, Louisville, Colo.

[21] Appl. No.: 611,922

[22] Filed: Dec. 6, 1990

[51] Int. Cl.⁵ .................................................. G11B 5/027
[52] U.S. Cl. ...................................... 360/85; 242/195; 360/95
[58] Field of Search .................................. 360/84–85, 360/94, 95, 132; 242/195

[56] References Cited

U.S. PATENT DOCUMENTS

| | | | |
|---|---|---|---|
| 3,783,200 | 1/1974 | Jantzen et al. | 179/100.2 |
| 3,848,263 | 11/1974 | Nagaoka | 360/83 |
| 3,900,892 | 8/1975 | Sugaya et al. | 360/85 |
| 4,015,292 | 3/1977 | Kirn | 360/130 |
| 4,074,329 | 2/1978 | Sakumoto et al. | 360/85 |
| 4,432,508 | 2/1984 | Inoue et al. | 242/195 |
| 4,593,330 | 6/1986 | Warren | 360/85 |
| 4,608,614 | 8/1986 | Rinkleib et al. | 360/95 |

Primary Examiner—A. J. Heinz
Attorney, Agent, or Firm—Dorr, Carson, Sloan & Peterson

[57] ABSTRACT

This system makes use of a tape cassette helical scan tape transport and 3480-type magnetic tape cartridge as the data storage media. The merging of these two incompatible elements is accomplished by the use of a novel interface that implements a "virtual tape cassette" using a tape cartridge in a manner that makes this media compatible with the tape transport. The virtual tape cassette is implemented by providing a takeup reel positioned with the magnetic tape cartridge in a relationship that substantially matches the format of a magnetic tape cassette. A short tape threading arm is used to retrieve the leader block from the tape cartridge and thread the magnetic tape over a short tape threading path to the takeup reel. Once the tape is affixed to the takeup reel, the helical scan tape guide arms transport the length of tape that is now exposed between the tape cartridge and the takeup reel to the rotary heads.

42 Claims, 4 Drawing Sheets

APPARATUS FOR INTERFACING A CARTRIDGE TAPE WITH A HELICAL SCAN TRANSPORT

FIELD OF THE INVENTION

This invention relates to helical scan tape transports and, in particular, to apparatus that adapts a tape cassette helical scan tape transport to the use of tape cartridges.

PROBLEM

It is a problem in the field of data processing systems to most efficiently store data on a recording media while working within the constraints of industry standard media form factors. Commercially available helical scan video tape transports can be the basis of very high data density magnetic tape data storage subsystems. The helical scan tape transport architecture has already been applied to computer systems data storage in the form of modified helical scan tape transports which use either 4 mm, 8 mm or ½ inch magnetic tape formats. Unfortunately, all of these helical scan tape transports are designed for cassette type media that is not compatible with existing data processing manual or automated media handling systems and, in the case of the video tape cassette media, not mechanically well suited to the rigors of the commercial data processing environment. In addition, typical helical scan tape cassettes contain both supply and takeup reels, with the provision of the empty takeup reel in each tape cassette representing an inefficient use of space.

The data processing industry standard 3480-type magnetic tape cartridge offers the advantages of durability, handling compatibility and the volumetric efficiency of a single reel, but is mechanically incompatible with existing helical scan tape transports. The 3480-type tape cartridge is a single reel tape cartridge which has a leader block attached to one end of the tape. The tape transport mechanism threads the leader block end of the magnetic tape to a takeup reel over a predefined tape path which includes a plurality of bearings for guiding the tape and a read/write head assembly. The takeup reel includes a slot for receiving the leader block and is connected to an associated drive mechanism which transports the tape between the takeup reel and the tape cartridge.

In order to follow the complex tape threading path, a jointed tape threading arm is provided, whose path is determined by a cam track. The cam track has a beginning point for positioning a longitudinal cam member into engagement with the magnetic tape leader block which is exposed through an opening in the tape cartridge. The tape threading arm is connected at one end to the longitudinal cam member and at the other end to a servo controlled drive motor. The drive motor activates the tape threading arm to transport the longitudinal cam member from the end of the cam track, where it engages the leader block, to a slot in the takeup reel, threading the magnetic tape through the tape threading path as it traverses this path. Due to the complex nature of this tape threading path, a servo mechanism controls the threading arm operation to pull the tape at a constant speed and provide a constant tension on the tape as it is being withdrawn from the tape cartridge and transported to the takeup reel.

Another approach to tape loading was demonstrated in a tape cartridge design which used, in place of a leader block, an elongated stiff member (leader tape) wider than the associated magnetic tape and attached to the end thereof for tape threading purposes. This stiff leader tape fits into a slotted tape threading track which follows a complex tape threading path around the associated heads to the takeup reel. As the leader tape traverses the entirety of this complex tape threading path, the narrower magnetic tape is also pulled through the tape threading path and physically wrapped around a rotary head. This tape transport apparatus was used to read and write video signals on the magnetic tape in helical scan format but suffered from the complexity of the tape threading path and the need for a long stiff leader tape member attached to the end of the magnetic tape, which must be pushed through the tape threading path by the unwinding action of the tape cartridge reel.

An alternative helical scan data storage apparatus uses a magnetic tape configuration that consists of a two reel tape cassette. In one application, the two reel cassette placed the reels coaxially, one over the other, and provided an angled tape path within the tape cassette between the two reels to transport the tape between the two reels. A window is provided in the front of the cassette so that a tape threading mechanism could access a length of tape to retrieve it from within the tape cassette and wrap it around the rotary heads of the helical scan tape transport. The tape retrieved from the tape cassette is on an angular relationship with the takeup and supply reels and this angular relationship must be maintained as the tape is applied to the rotary head in order to enable the writing of data in helical scan format thereon. Complex tape guide mechanisms were provided in this apparatus to maintain the proper angular relationship of the tape to the rotary head.

Another helical scan system is the video cassette recording (VCR) tape transport that makes use of a rotary head and analog video recording in a helical scan format. The VCR mechanism obviates the need for a complex tape threading apparatus by placing two reels in the tape cassette in a coplanar, juxtaposed relationship. Instead of angling the tape, the rotary head is angled with respect to the coplanar source and takeup reels. In this manner, the tape maintains a coplanar transport relationship with the source and takeup reels and it is the head that is positioned to be at the proper angular relationship with the recording surface of the tape.

The 3480-type tape cartridge has become the data processing industry standard form factor. The helical scan transports are not applicable to the computer data storage environment due to the different tape form factor even though they have a greater data recording density than 3480-type media. These helical scan tape transports have primarily found use in the video cassette recording technology. Thus, the tape cartridge longitudinal format data storage media and the tape cassette helical scan format data storage media are two diverse technologies with inconsistent requirements.

SOLUTION

The above described problems are solved and a technical advance achieved in the art by the cartridge tape system for a helical scan tape transport. The successful integration of the incompatible helical scan tape transport and tape cartridge media elements centers on the tape path used in the tape transport and the apparatus used to load and unload the magnetic tape through this path. A novel interface has been developed to present the tape cartridge media to a helically scanned head in a manner that emulates tape cassette media. The resulting "virtual tape cassette" nakes the tape cartridge media compatible with the tape transport.

The virtual tape cassette is implemented by providing a takeup reel positioned with respect to the magnetic tape cartridge in a relationship that substantially matches the format of the magnetic tape cassette required by the associated helical scan drive. A short tape threading arm is used to retrieve the end of the magnetic tape from the tape cartridge and thread the magnetic tape over a short tape threading path to the takeup reel. A leader block is typically provided on the end of the magnetic tape to enable the tape threading arm to securely grasp the end of the tape. Once the tape leader block is inserted into the takeup reel, a helical scan tape wrap mechanism transports the length of magnetic tape, that is now exposed between the tape cartridge and the takeup reel, to the rotary heads which are located in a position with respect to the tape cartridge and takeup reel to be compatible with the tape cassette operation of the helical scan transport.

This cartridge tape system therefore operates in a two step process: first — threading the magnetic tape from a tape cartridge to a takeup reel to create a virtual tape cassette image, second — transporting the magnetic tape from the virtual tape cassette onto the rotary head of the helical scan tape transport. By use of this two step process, the need for complex tape threading paths is avoided and the computer system compatible 3480-type tape cartridge can be used in the higher data recording density helical scan tape transport. In addition to this adaptation of the 3480-type tape cartridge's mechanical form factor, a magnetic tape that has been optimized magnetically and mechanically for helical scan usage can be loaded into the 3480-type tape cartridge.

DETAILED DESCRIPTION

Figure 1:
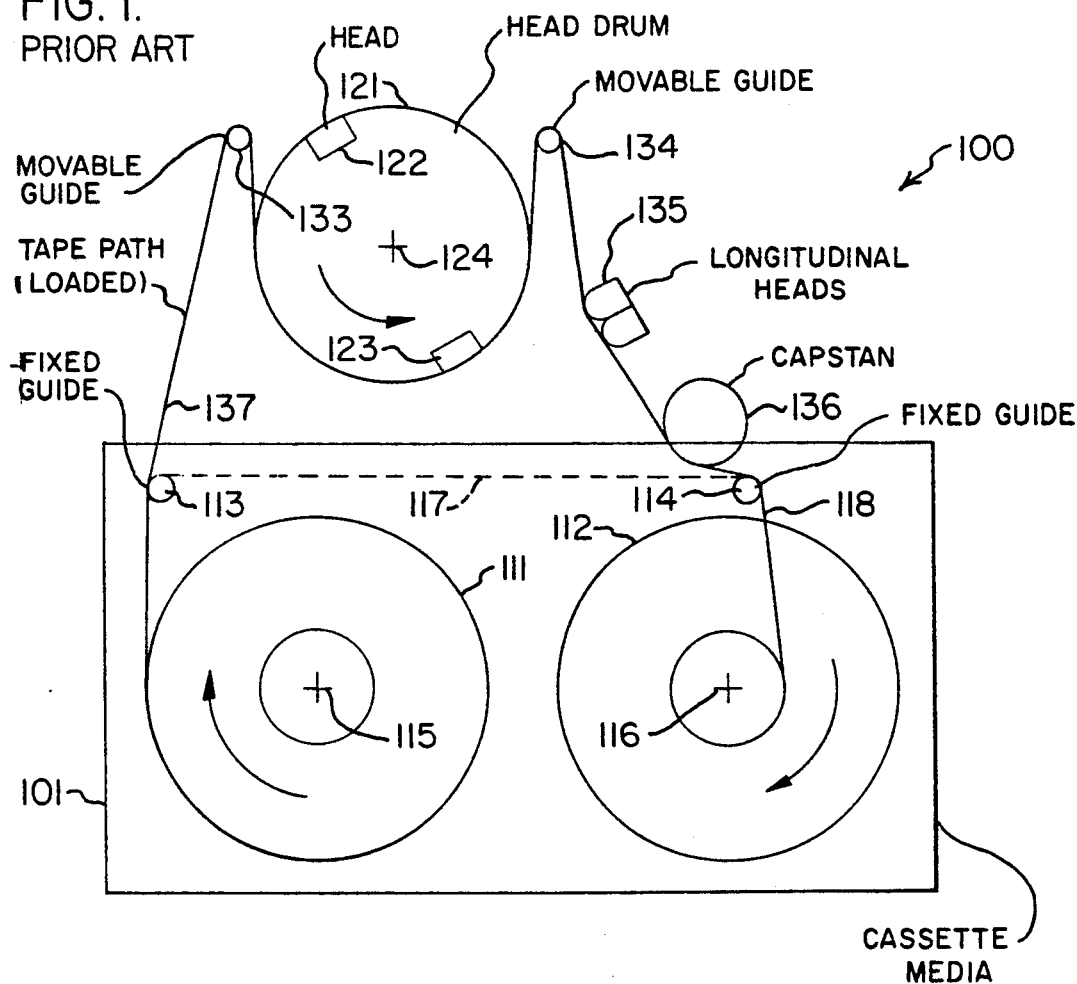
FIG. 1 illustrates, in block diagram form, the overall architecture of a typical prior art tape cassette helical scan transport.

FIG. 1 illustrates the architecture of a basic prior art helical scan tape cassette drive 100. A tape cassette 101 contains a pair of juxtaposed reels 111, 112 as the transport mechanism for magnetic tape 118. Each of reels 111, 112 is rotatably mounted on an associated spindle 115, 116, respectively, and rotates in a clockwise direction to transport the magnetic tape 118 from the supply reel 111 to the takeup reel 112. The tape cassette 101 includes a fixed guide 113 located adjacent to the supply reel 111 and another fixed guide 114 located adjacent to the takeup reel 112. Fixed guides 113, 114 are used to guide the positioning of magnetic tape 118. Dotted line path 117 indicates the placement of magnetic tape 118 in tape cassette 101 as it is placed into the helical scan tape transport 100. Fixed guides 113, 114 position magnetic tape 118 along path 117 so that it is accessible by the helical scan tape transport mechanism, to be retrieved from within tape cassette 101.

In well known fashion, when tape cassette 101 is loaded into the helical scan tape drive, a pair of moveable guides 133, 134 are activated to a first position wherein the magnetic tape 118, as placed on path 117, is located between the moveable guides 133, 134 and the rotary head 121. The moveable guides 133, 134 (or a vacuum) are operated to retrieve magnetic tape 118 from path 117 and transport magnetic tape 118 to wrap around rotary head 121 as illustrated in FIG. 1. Rotary head 121 is rotatable about spindle 124 and includes a pair of heads 122, 123 for reading and writing data onto the magnetic tape 118. The positioning of magnetic tape 118 as illustrated in FIG. 1 traverses a path 137 such that magnetic tape 118 extends from file reel 111, over fixed guide 113 of tape cassette 101, over moveable guide 133, rotary head 121, moveable guide 134, longitudinal heads 135, capstan 136 of the helical scan transport mechanism, and fixed guide 114 of tape cassette 101. When the tape is placed in this position, data can be written to or read from magnetic tape 118. The helical scan tape transport mechanism 100 illustrated in FIG. 1 is dependent on the use of tape cassette 101 that contains a pair of coplanar, juxtaposed reels 111, 112 having the magnetic tape 118 extending therebetween along path 117 so that the helical scan transport mechanism 100 can retrieve the magnetic tape 118 from tape cassette 101 to position the magnetic tape 118 along path 137 as illustrated in FIG. 1. It is obvious that this architecture is incompatible with the use of a single reel tape cartridge.

Figure 2:
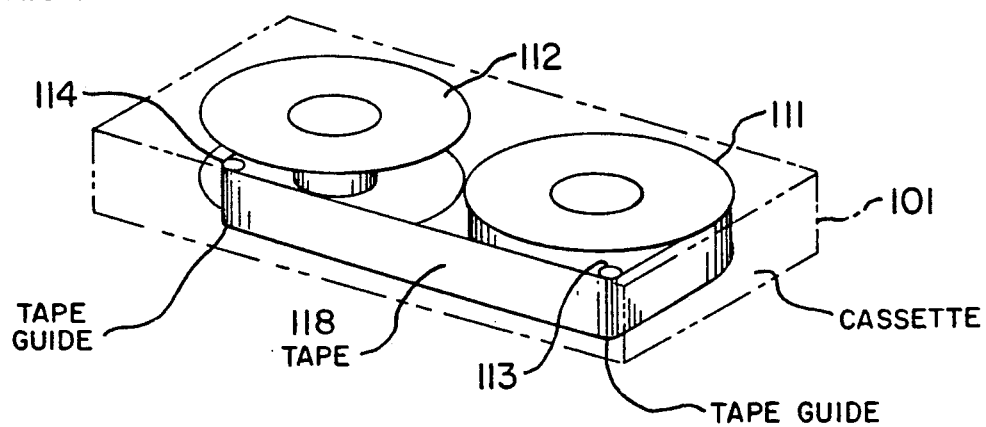
FIG. 2 illustrates, in perspective view, a typical prior art tape cassette.

FIG. 2 illustrates a perspective drawing of tape cassette 101 showing supply reel 111 and takeup reel 112 along with fixed guides 113, 114. Magnetic tape 118, as can be seen from this figure, extends from supply reel 111 to takeup reel 112 along one edge of tape cassette 101. Tape cassette 101 typically includes an access door (not shown) adjacent to magnetic tape 118 such that the helical scan tape transport can open the access door to access magnetic tape 118 located within tape cassette 101.

Virtual Tape Cassette

Figure 3:
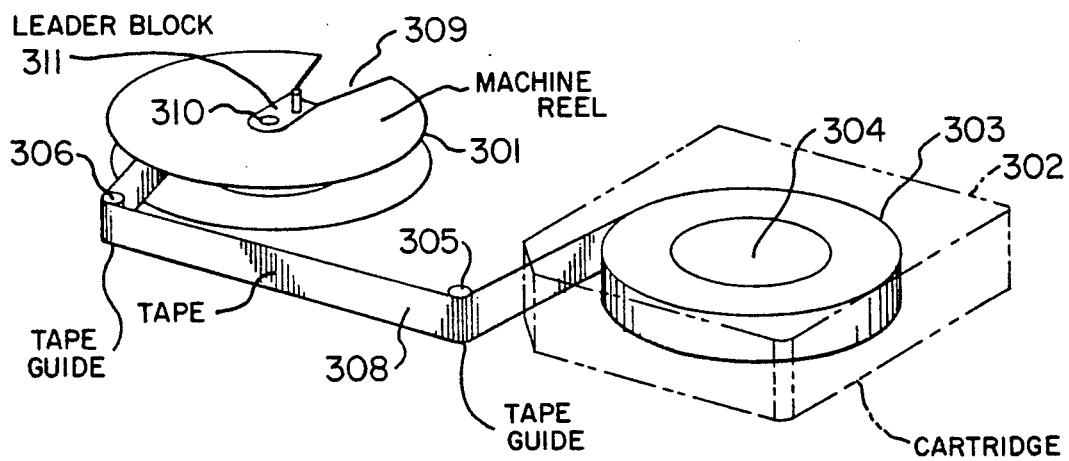
FIG. 3 illustrates, in perspective view, the orientation of the tape cartridge and takeup reel in the virtual tape cassette of the present invention.

FIG. 3 illustrates in perspective view, a typical virtual tape cassette that is implemented using a tape cartridge 302. In this configuration, a tape cartridge 302 containing a single supply reel 303 rotatably mounted on a spindle 304 is positioned substantially coplanar with and adjacent to takeup reel 301 to emulate one type of tape cassette. Tape cartridge 302 contains a length of magnetic tape 308 stored therein. At one end of magnetic tape 308 is affixed a leader block 311 which is used by a typical tape cartridge transport to retrieve a length of magnetic tape 308 from tape cartridge 302 and thread the magnetic tape 308 along a tape threading path to the slot 309 in takeup reel 301 which is configured to receive leader block 311. Takeup reel 301 is rotatably mounted on a spindle 310. A pair of fixed guides 305, 306 are provided in the configuration illustrated in FIG. 3 in order to position magnetic tape 308 in a manner that is analogous to that illustrated in FIG. 2 for the tape cassette 101. The virtual tape cassette of FIG. 3 provides substantially the same configuration of supply reel 303 and takeup reel 301 as that of tape cassette 101 illustrated in FIG. 2. The positioning of tape cartridge 302 matches that used in tape cartridge drives so that loading and unloading of tape cartridge 302 from the cartridge drive of the present invention is substantially the same as that used in standard tape cartridge drives. It is obvious that another virtual tape cassette that can be similarly emulated in the two reel coaxial tape cassette using a slightly different tape threading mechanism.

Tape Cartridge Handling Mechanism for Helical Scan Drive

Figure 4:
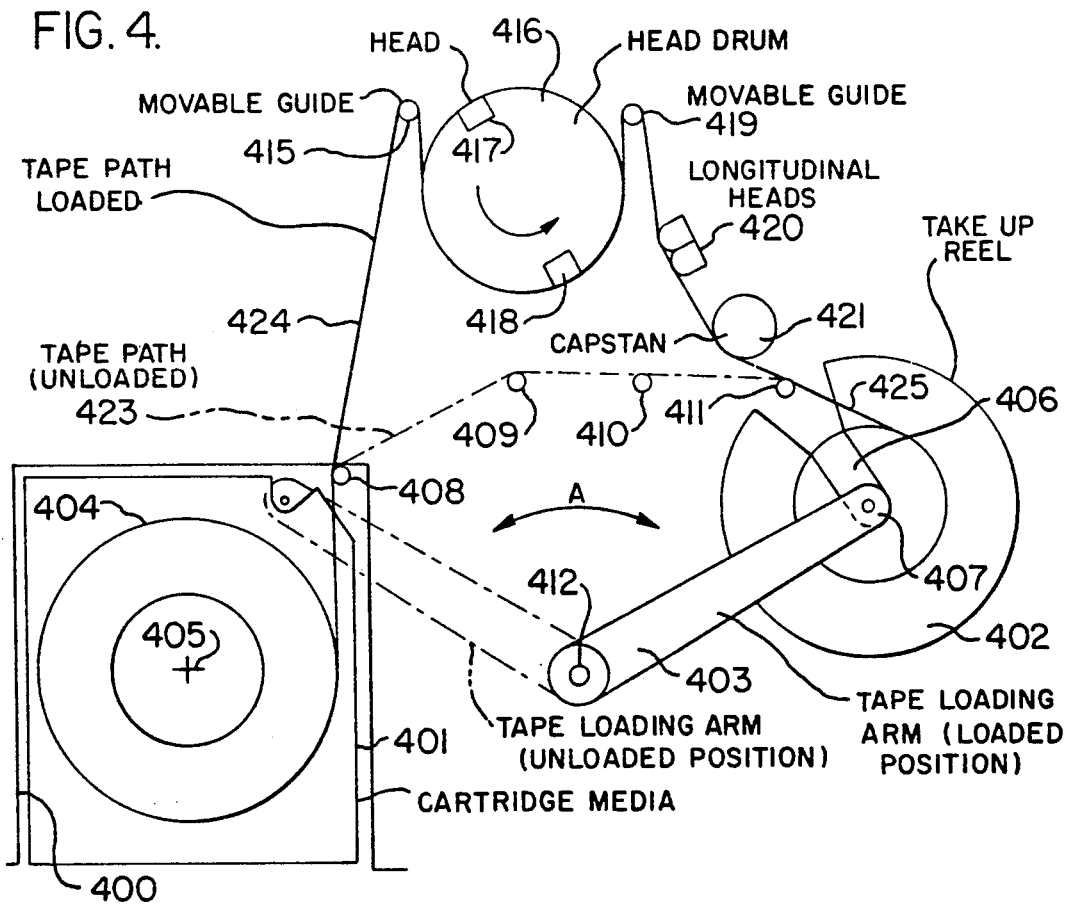
FIG. 4 illustrates the architecture of the apparatus of the present invention, using a helical scan tape transport with a unique virtual tape cassette.

FIG. 4 illustrates the architecture of a tape cartridge handling mechanism for use with a helical scan tape transport. The tape transport illustrated in FIG. 4 is identical to that illustrated in FIG. 1. The virtual tape cassette is implemented using cartridge 401 which contains a source reel 404 rotatably mounted on spindle 405. Tape cartridge 401 is loaded into a receiving mechanism 400 which includes a plurality of elements not illustrated in FIG. 4 for simplicity purposes including: a drive motor, servo mechanism, eject mechanism, etc. A takeup reel 402 and tape threading mechanism, such as tape threading arm 403 are provided to transform tape cartridge 401 into a virtual tape cassette. Tape cartridge 401 when positioned in a receiver 400 is substantially coplanar with and located adjacent to takeup reel 402. In addition, rotary head 416 is typically substantially coplanar with and adjacent to tape cartridge 401 and takeup reel 402. In order to optimize the contact between magnetic tape 425 and rotary head 416, it may be advantageous to orient the takeup reel 402 so it is not coplanar with the tape cartridge 401. In this configuration, the magnetic tape 425 follows an angled path from tape cartridge 401 to rotary head 416 to takeup reel 402.

In the system illustrated in FIG. 4, a plurality of fixed guides 408, 411 are provided to position the magnetic tape 425 along a tape path 423 which emulates a tape path used in a tape cassette. In operation, tape threading arm 403 is pivotally attached to spindle 412 and operates by swinging in the arc illustrated by arrow A to grasp leader block 407 from tape cartridge 401 and thread magnetic tape 425 along path 423 to takeup reel 402 where leader block 407 is inserted into slot 406. Tape threading arm 403 positions magnetic tape 425 along fixed guides 408, 411 as it traverses its path.

The second step in the tape loading operation is the tape wrap process which transports the magnetic tape to contact the rotary head 416. The positioning of magnetic tape 425 along path 423 enables one or more moveable guides 415, 419 of the tape wrap mechanism, when in a first position (indicated by 409, located such that tape path 423 is between moveable guides 415, 419 and rotary head 416, to grasp magnetic tape 425 on the backside thereof and transport magnetic tape 425 from tape path 423 to tape path 424 as illustrated in FIG. 4. Magnetic tape is wrapped around rotary head 416 by one or more moveable guides 415, 419 as described above with respect to the helical scan tape transport mechanism of FIG. 1. By contacting the back surface of magnetic tape 425, moveable guides 415, 419 guide magnetic tape 425 into position in the tape loaded path 424 without causing wear on the recording surface of magnetic tape 425.

Thus, the mechanism illustrated in FIG. 4 operates in a two step process. The first step consists of tape threading arm 403 grasping the leader block 407 once the tape cartridge 401 is inserted into the receiver 400 and threading magnetic tape 425 along tape path 423 to takeup reel 402. Once this first operation is completed, then the helical scan tape transport mechanism can transport the magnetic tape from path 423 to path 424 where it is helically wrapped around rotary head 416.

Conventional Tape Cartridge Mechanism

Figure 5:
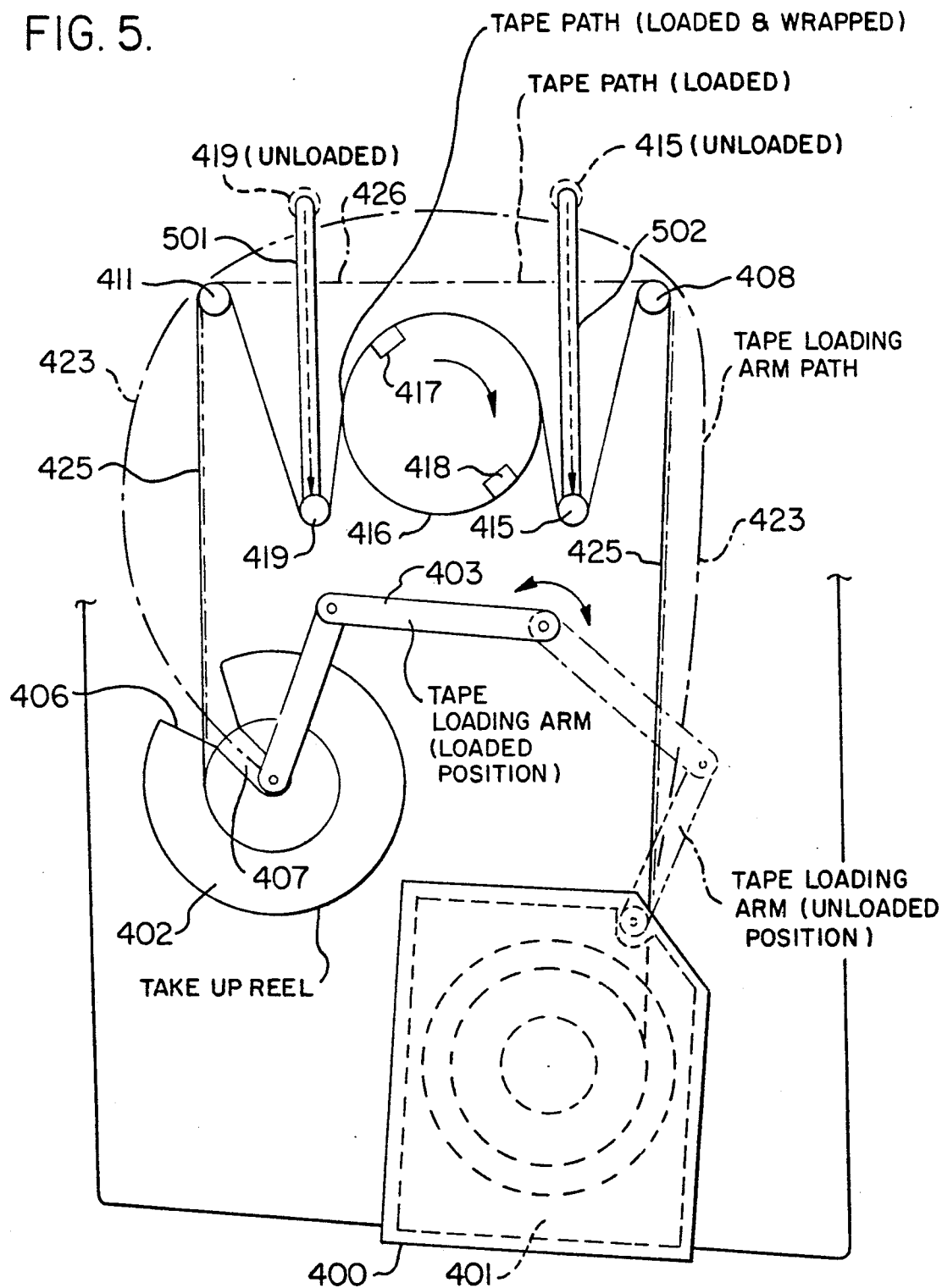
FIGS. 5 and 6 illustrate the architecture of the apparatus of the present invention, using a conventional tape cartridge tape transport.
Figure 6:
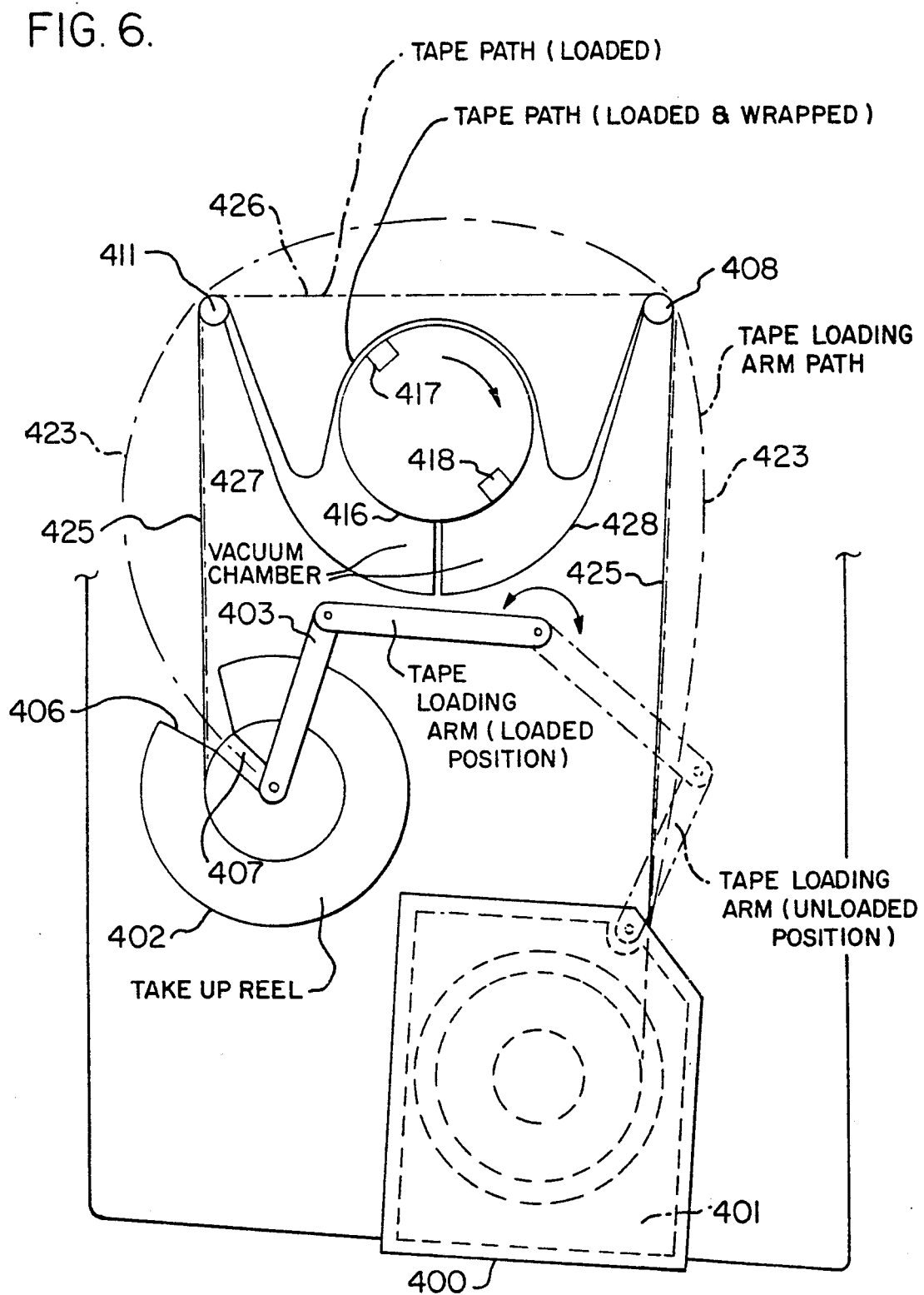

FIGS. 5 and 6 illustrate the implementation of the tape cartridge apparatus for helical scan tape transports using a conventional tape cartridge mechanism. This mechanism consists of a tape cartridge receiver 400 which receives tape cartridge 401. Takeup reel 402 is located adjacent to tape cartridge 401 and includes the leader block slot 406. Tape threading arm 403 is provided to grasp the leader block 407 on magnetic tape 425 and thread magnetic tape 425 along tape threading path 423, which includes fixed guides 408, 411, to insert the leader block into slot 406 of takeup reel 402. Once the magnetic tape 425 is positioned along tape threading path 423, the tape wrap mechanism, in the form of moveable guides 415, 419 of the helical scan mechanism, are moveable along guide paths 501, 502 to appropriately position magnetic tape 425 on rotary head 416. In this mechanism, the standard tape cartridge drive mechanism has been adapted by removing the read/write head unit therefrom and replacing it with a helical scan tape loading mechanism. In addition, the tape threading path has been significantly simplified since a complex tape threading path is not required. In fact, the two step process described above can be modified using this mechanism to enable the helical scan loading mechanism to begin transporting the magnetic tape 425 from tape loading path 423 to the rotary head 416 once the tape threading arm 403 has traversed tape loading path 423 and is positioned past fixed guide 422. The magnetic tape 425 is properly positioned for loading onto rotary head 416 once this segment of the tape loading path 423 has been traversed by tape threading arm 403. An additional tension will be placed on magnetic tape 425 by the operation of the helical scan tape loading mechanism, but this is easily compensated for by the servo mechanism on tape threading arm 403 such that the completion of the tape threading operation is concurrent with transporting of the magnetic tape 425 to the rotary head 416.

An alternative to the architecture illustrated in FIG. 5 is the use of a pneumatic tape wrap system as in FIG. 6. The tape threading path is similar to that shown in FIG. 5, but includes a source of pressurized fluid, such as air, which forces the magnetic tape 425 into contact with the rotary head 416 once the tape threading operation is completed.

In both of the embodiments disclosed above, many of the standard mechanisms located in the tape transport mechanism have not been shown for the purpose of simplicity but are well known in the art. The virtual tape cassette of the present invention converts a tape cartridge to the form factor necessary for the operation of the helical scan tape drive. This conversion can be implemented using a modified standard tape cartridge drive mechanism adapted for this purpose or can be implemented using a unique and simplified drive mechanism. In either case, the tape cassette helical scan tape transport mechanism is merged with the computer data standard tape cartridge via this virtual cassette interface to provide a magnetic tape drive that provides the data density benefits of the helical scan drive and the form factor standardization of the present tape cartridge mechanism.

While a specific embodiment of this invention has been disclosed, it is expected that those skilled in the art can and will design alternate embodiments of this invention that fall within the scope of the appended claims.

I claim:

1. A helical scan tape transport apparatus for reading and writing data on to a magnetic recording tape which is supplied on a removable tape cartridge, containing a single reel rotatable mounted within said tape cartridge, and having a leader block affixed to one end of said magnetic recording tape for use in withdrawing said one end from said tape cartridge, comprising:

means for receiving a tape cartridge;

takeup reel means permanently mounted in said tape transport apparatus for receiving said one end of said magnetic recording tape contained in said tape cartridge;

tape threading means for grasping said leader block to thread said magnetic recording tape along a predetermined path from said tape cartridge to said takeup reel means;

rotary head means for reading and writing data on to magnetic recording tape in a helical scan format; and tape wrap means for translating said threaded magnetic tape from said predetermined path to helically wrap about said rotary head means.

2. The apparatus of claim 1 further including:

a first fixed guide means located adjacent to said receiving means for supporting said magnetic tape in a predetermined position as it is threaded along said predetermined path;

a second fixed guide means located adjacent to said takeup reel means for supporting said magnetic tape in a predetermined position as it is threaded along said predetermined path.

3. The apparatus of claim 2 wherein said tape wrap means includes:

at least one movable guide means movable between a first position, wherein said predetermined path is located between said movable guide means and said rotary head means, and a second position, wherein said magnetic tape is helically wrapped about said rotary head means.

4. The apparatus of claim 3 wherein said tape wrap means further includes:

means, responsive to said tape threading means threading said magnetic recording tape along said predetermined path from said tape cartridge to a location past said second fixed guide means, for activating said movable guide means to move from said first position to said second position.

5. The apparatus of claim 3 wherein said tape wrap means further includes:

means, responsive to said tape threading means threading said magnetic recording tape along said predetermined path from said tape cartridge to said takeup reel means, for activating said movable guide means to move from said first position to said second position.

6. The apparatus of claim 1 wherein said receiving means, said takeup reel means, and said tape threading means all comprise a standard tape cartridge drive.

7. The apparatus of claim 1 wherein said rotary head means and said tape wrap means comprise a standard tape cassette drive.

8. A helical scan tape transport apparatus for reading and writing data on to a magnetic recording tape which is supplied on a removable tape cartridge, containing a single reel rotatably mounted within said tape cartridge, and having a leader block affixed to one end of said magnetic recording tape for use in withdrawing said one end from said tape cartridge, comprising:

means for receiving a tape cartridge;

takeup reel means permanently mounted in said tape transport apparatus, substantially coplanar with said receiving means and juxtaposed therewith, for receiving said one end of said magnetic recording tape contained in said tape cartridge;

tape threading means for grasping said leader block to thread said magnetic recording tape along a predetermined path from said tape cartridge to said takeup reel means;

rotary head means, substantially coplanar with said receiving means and juxtaposed therewith, for reading and writing data on to magnetic recording tape in a helical scan format; and tape wrap means for translating said threaded magnetic tape from said predetermined path to helically wrap about said rotary head means.

9. The apparatus of claim 8 further including:

a first fixed guide means located adjacent to and substantially coplanar with said receiving means for supporting said magnetic tape in a predetermined position as it is threaded along said predetermined path;

a second fixed guide means located adjacent to and substantially coplanar with said takeup reel means for supporting said magnetic tape in a predetermined position as it is threaded along said predetermined path.

10. The apparatus of claim 9 wherein said tape wrap means includes:

at least one movable guide means movable between a first position, wherein said predetermined path is located between said movable guide means and said rotary head means, and a second position, wherein said magnetic tape is helically wrapped about said rotary head means.

11. The apparatus of claim 10 wherein said tape wrap means further includes:

means, responsive to said tape threading means threading said magnetic recording tape along said predetermined path from said tape cartridge to a location past said second fixed guide means, for activating said movable guide means to move from said first position to said second position.

12. The apparatus of claim 10 wherein said tape wrap means further includes:

means, responsive to said tape threading means threading said magnetic recording tape along said predetermined path from said tape cartridge to said takeup reel means, for activating said movable guide means to move from said first position to said second position.

13. The apparatus of claim 8 wherein said receiving means, said takeup reel means, and said tape threading means all comprise a standard tape cartridge drive.

14. The apparatus of claim 8 wherein said rotary head means and said tape wrap means comprise a standard tape cassette drive.

15. In a helical scan transport apparatus that reads and writes data in a helical scan format, via a rotary head, on to a magnetic recording tape, which is supplied on a tape cassette containing two rotatably mounted reels, said tape transport system including a threading guide for translating said magnetic tape from said tape cassette to helically wrap about said rotary head, a cassette to helically wrap about said rotary head, a cassette interface apparatus for interfacing said helical scan tape transport system with a removable tape cartridge, containing a single reel rotatably mounted within said tape cartridge, and having a leader block affixed to one end of said magnetic recording tape for use in withdrawing said one end from said tape cartridge, comprising:

means for receiving said tape cartridge;

takeup reel means permanently mounted in said tape transport apparatus, for receiving said one end of said magnetic recording tape contained in said tape cartridge;

tape threading means for grasping said leader block to thread said magnetic recording tape along a predetermined path from said tape cartridge to said takeup reel means; and tape wrap means for translating said threaded magnetic tape from said predetermined path to helically wrap about said rotary head.

16. The apparatus of claim 15 further including:

a first fixed guide means located adjacent to said receiving means for supporting said magnetic tape in a predetermined position as it is threaded along said predetermined path;

a second fixed guide means located adjacent to said takeup reel means for supporting said magnetic tape in a predetermined position as it is threaded along said predetermined path.

17. The apparatus of claim 16 wherein said threading guide is movable between a first position, wherein said predetermined path is located between said threading guide and said rotary head, and a second position, wherein said magnetic tape is helically wrapped about said rotary head.

18. The apparatus of claim 17 further including:

means, responsive to said tape threading arm means threading said magnetic recording tape along said predetermined path from said tape cartridge to a location past said second fixed guide means, for activating said threading guide to move from said first position to said second position.

19. The apparatus of claim 17 further including:

means, responsive to said tape threading means threading said magnetic recording tape along said predetermined path from said tape cartridge to said takeup reel means, for activating said threading guide to move from said first position to said second position.

20. The apparatus of claim 15 wherein said receiving means, said takeup reel means, and said tape threading means all comprise a standard tape cartridge drive.

21. The apparatus of claim 15 wherein said rotary head and said threading guide comprise a standard tape cassette drive.

22. In a helical scan tape transport apparatus for reading and writing data on to a magnetic recording tape which is supplied on a removable tape cartridge, containing a single reel rotatably mounted within said tape cartridge, and having a leader block affixed to one end of said magnetic recording tape for use in withdrawing said one end from said tape cartridge, said tape transport including a takeup reel permanently mounted in said tape transport apparatus for receiving said one end of said magnetic recording tape contained in said tape cartridge and a rotary head for reading and writing data on to magnetic recording tape in a helical scan format, a method of threading said magnetic recording tape from said tape cartridge on to said rotary head comprising the steps of:

threading said magnetic recording tape along a predetermined path from said tape cartridge to said takeup reel;

translating said threaded magnetic tape from said predetermined path to helically wrap about said rotary head.

23. The method of claim 22 wherein the tape transport apparatus includes a first fixed guide located adjacent to said tape cartridge for supporting said magnetic tape in a predetermined position as it is threaded along said predetermined path, a second fixed guide located adjacent to said takeup reel for supporting said magnetic tape in a predetermined position as it is threaded along said predetermined path, said step of threading includes:

transporting said magnetic tape from said tape cartridge, across said first fixed guide, across said second fixed guide, to said takeup reel to emulate the format of a magnetic tape in a tape cassette.

24. The method of claim 23 wherein said step of translating includes:

moving at least one movable guide from a first position, wherein said predetermined path is located between said movable guide and said rotary head, to a second position, wherein said magnetic tape is helically wrapped about said rotary head.

25. The method of claim 24 wherein said step of moving is initiated when said magnetic recording tape is threaded along said predetermined path from said tape cartridge to a location past said second fixed guide.

26. The method of claim 24 wherein said step of moving is initiated when said magnetic recording tape is threaded along said predetermined path from said tape cartridge to said takeup reel.

27. The method of claim 22 wherein the tape transport apparatus includes a first fixed guide located adjacent to said tape cartridge for supporting said magnetic tape in a predetermined position as it is threaded along said predetermined path, a second fixed guide located adjacent to said takeup reel for supporting said magnetic tape in a predetermined position as it is threaded along said predetermined path, said step of translating includes:

moving at least one movable guide from a first position, wherein said predetermined path is located between said movable guide and said rotary head, to a second position, wherein said magnetic tape is helically wrapped about said rotary head.

28. The method of claim 27 wherein said step of moving is initiated when said magnetic recording tape is threaded along said predetermined path from said tape cartridge to a location past said second fixed guide.

29. The method of claim 27 wherein said step of moving is initiated when said magnetic recording tape is threaded along said predetermined path from said tape cartridge to said takeup reel.

30. The method of claim 22 wherein said step of threading includes:

grasping said leader block on said magnetic tape;

transporting said leader block along said tape threading path;

inserting said leader block into said takeup reel.

31. In a helical scan tape transport system for reading and writing data on to a magnetic recording tape which is supplied on a removable tape cartridge, containing a single reel rotatably mounted within said tape cartridge, and having a leader block affixed to one end of said magnetic recording tape for use in withdrawing said one end from said tape cartridge, said tape transport including a permanently mounted takeup reel, substantially coplanar with said tape cartridge and juxtaposed therewith, for receiving said one end of said magnetic recording tape contained in said tape cartridge and a rotary head, substantially coplanar with said takeup reel and juxtaposed therewith, for reading and writing data on to magnetic recording tape in a helical scan format, a method of threading said magnetic recording tape form said tape cartridge on to said rotary head in helical scan format, comprising the steps of:

grasping said leader block from said tape cartridge;

threading said magnetic recording tape along a predetermined path from said tape cartridge to said takeup reel; and translating said threaded magnetic tape from said predetermined path to helically wrap about said rotary head.

32. The method of claim 31 wherein the tape transport apparatus includes a first fixed guide located adjacent to said tape cartridge for supporting said magnetic tape in a predetermined position as it is threaded along said predetermined path, a second fixed guide located adjacent to said takeup reel for supporting said magnetic tape in a predetermined position as it is threaded along said predetermined path, said step of threading includes:

transporting said magnetic tape from said tape cartridge, across said first fixed guide, across said second fixed guide, to said takeup reel to emulate the format of a magnetic tape in a tape cassette.

33. The method of claim 32 wherein said step of translating includes:

moving at least one movable guide from a first position, wherein said predetermined path is located between said movable guide and said rotary head, to a second position, wherein said magnetic tape is helically wrapped about said rotary head.

34. The method of claim 33 wherein said step of moving is initiated when said magnetic recording tape is threaded along said predetermined path from said tape cartridge to a location past said second fixed guide.

35. The method of claim 33 wherein said step of moving is initiated when said magnetic recording tape is threaded along said predetermined path from said tape cartridge to said takeup reel.

36. The method of claim 31 wherein the tape transport apparatus includes a first fixed guide located adjacent to said tape cartridge for supporting said magnetic tape in a predetermined position as it is threaded along said predetermined path, a second fixed guide located adjacent to said takeup reel for supporting said magnetic tape in a predetermined position as it is threaded along said predetermined path, said step of translating includes:

moving at least one movable guide from a first position, wherein said predetermined path is located between said movable guide and said rotary head, to a second position, wherein said magnetic tape is helically wrapped about said rotary head.

37. The method of claim 36 wherein said step of moving is initiated when said magnetic recording tape is threaded along said predetermined path from said tape cartridge to a location past said second fixed guide.

38. The method of claim 36 wherein said step of moving is initiated when said magnetic recording tape is threaded along said predetermined path from said tape cartridge to said takeup reel.

39. The method of claim 31 wherein said step of threading includes:

grasping said leader block on said magnetic tape;

transporting said leader block along said tape threading path;

inserting said leader block into said takeup reel.

40. A helical scan tape transport apparatus for reading and writing data on to a magnetic recording tape which is supplied on a removable tape cartridge, containing a single reel rotatably mounted within said tape cartridge, and having a leader block affixed to one end of said magnetic recording tape for use in withdrawing said one end from said tape cartridge, comprising:

means for receiving a tape cartridge;

takeup reel means permanently mounted in said tape transport apparatus for receiving said one end of said magnetic recording tape contained in said tape cartridge;

tape threading means for grasping said leader block to thread said magnetic recording tape along a predetermined path from said tape cartridge to said takeup reel means;

rotary head means for reading and writing data on to magnetic recording tape in a helical scan format;

tape wrap means for translating said threaded magnetic tape from said predetermined path to helically wrap about said rotary head means including at least one movable guide means movable guide means movable between a first position, wherein said predetermined path is located between said movable guide means and said rotary head means, and a second position, wherein said magnetic tape is helically wrapped about said rotary head means, means, responsive to said tape threading means threading said magnetic recording tape along said predetermined path from said tape cartridge to a location past said second fixed guide means, for activating said movable guide means to move from said first position to said second position;

a first guide means, located adjacent to said receiving means for supporting said magnetic tape in a predetermined position as it is threaded along said predetermined path; and a second fixed guide means located adjacent to said takeup reel means for supporting said magnetic tape in a predetermined position as it is threaded along said predetermined path.

41. The apparatus of claim 40 wherein said receiving means, said takeup reel means, and said tape threading means all comprise a standard tape cartridge drive.

42. The apparatus of claim 40 wherein said rotary head means and said threading guide means comprise a standard tape cassette drive.

* * * * *